United States Patent
Rusinov

(10) Patent No.: US 11,258,869 B2
(45) Date of Patent: Feb. 22, 2022

(54) METHOD AND SYSTEM FOR CONTROLLING DOWNLOADING OF A FILE IN A CLOUD STORAGE SERVICE

(71) Applicant: YANDEX EUROPE AG, Lucerne (CH)

(72) Inventor: Vladimir Alexandrovich Rusinov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 1044 days.

(21) Appl. No.: 15/108,831

(22) PCT Filed: Sep. 18, 2014

(86) PCT No.: PCT/IB2014/064634
§ 371 (c)(1),
(2) Date: Jun. 29, 2016

(87) PCT Pub. No.: WO2015/140607
PCT Pub. Date: Sep. 24, 2015

(65) Prior Publication Data
US 2016/0323400 A1    Nov. 3, 2016

(30) Foreign Application Priority Data

Mar. 17, 2014 (RU) .......................... RU2014110276

(51) Int. Cl.
G06F 15/16 (2006.01)
H04L 67/50 (2022.01)
(Continued)

(52) U.S. Cl.
CPC .......... *H04L 67/22* (2013.01); *G06F 21/6209* (2013.01); *H04L 41/0896* (2013.01); *H04L 67/06* (2013.01); *H04L 67/10* (2013.01)

(58) Field of Classification Search
CPC ..... H04L 67/22; H04L 41/0896; H04L 67/06; H04L 67/10; H04L 63/10; H04L 67/02;
(Continued)

(56) References Cited

U.S. PATENT DOCUMENTS 9,928,047 B2 * 3/2018 Ein-Gal .................... G06F 8/61
9,973,875 B2 * 5/2018 Schwartz ................ H04W 4/00
(Continued)

FOREIGN PATENT DOCUMENTS

RU        2454711 C1      6/2012
WO   WO-2006122297 A2 * 11/2006 ............. H04L 63/08
WO   WO-2011091354 A2 *  7/2011 .......... G06F 11/1453

OTHER PUBLICATIONS

Policy-based access control in peer-to-peer grid systems J.F. da Silva;L.P. Gaspary;M.P. Barcellos; A. Detsch The 6th IEEE/ACM International Workshop on Grid Computing, 2005. (Year: 2005).*
(Continued)

*Primary Examiner* — Oscar A Louie
*Assistant Examiner* — Oluwatosin M Gidado
(74) *Attorney, Agent, or Firm* — BCF LLP

(57) ABSTRACT

There are provided a method and a system for controlling downloading of a file in a cloud storage service. The method can be executed at a server. The method comprises appreciating an activity parameter representative of total download activity of a file from a cloud storage service via a communication network, and, responsive to the activity parameter being above a pre-determined threshold, applying a remedial action to the downloading of the file, such that the remedial action is applied only to downloading of the file via a data transmittal path that a user has received from the user who uploaded the file to the cloud storage service, and downloading of the file by the user who uploaded the file is not affected.

20 Claims, 4 Drawing Sheets

(51) Int. Cl.
*H04L 67/10* (2022.01)
*H04L 67/06* (2022.01)
*G06F 21/62* (2013.01)
*H04L 41/0896* (2022.01)

(58) Field of Classification Search
CPC . H04L 67/12; H04L 67/1097; G06F 21/6209; G06F 3/0482; G06F 3/04842; G06F 21/32; G06F 21/6245
USPC .......................................................... 709/225
See application file for complete search history.

(56) References Cited

U.S. PATENT DOCUMENTS

| | | | |
|---|---|---|---|
| 2002/0032728 A1* | 3/2002 | Sako | G06Q 30/02 709/203 |
| 2007/0204039 A1* | 8/2007 | Inamdar | H04L 67/06 709/225 |
| 2008/0015879 A1* | 1/2008 | Sennott | G06Q 30/0214 705/313 |
| 2009/0083563 A1* | 3/2009 | Murase | G06F 1/3268 713/324 |
| 2012/0110005 A1* | 5/2012 | Kuo | G06F 16/176 707/769 |
| 2012/0239805 A1* | 9/2012 | Savoor | G06Q 50/06 709/224 |
| 2013/0019145 A1 | 1/2013 | Kim et al. | |
| 2013/0051772 A1* | 2/2013 | Ramaswamy | H04N 21/25875 386/291 |
| 2013/0219050 A1 | 8/2013 | Park et al. | |
| 2013/0262537 A1* | 10/2013 | Srikrishna | G06F 16/93 707/827 |
| 2013/0275509 A1* | 10/2013 | Micucci | H04L 67/26 709/204 |
| 2013/0305039 A1* | 11/2013 | Gauda | G06F 21/6218 713/153 |
| 2014/0052825 A1* | 2/2014 | Luecke | H04L 67/327 709/219 |
| 2014/0165176 A1* | 6/2014 | Ow | G06F 21/6218 726/8 |
| 2014/0181916 A1* | 6/2014 | Koo | H04W 12/08 726/4 |
| 2014/0201848 A1* | 7/2014 | Kulkarni | G06F 21/6218 726/27 |
| 2014/0279596 A1* | 9/2014 | Waris | G06Q 10/083 705/317 |
| 2014/0280859 A1* | 9/2014 | Liu | H04L 41/00 709/223 |
| 2014/0283120 A1* | 9/2014 | Mao | H04L 63/107 726/28 |
| 2015/0071074 A1* | 3/2015 | Zaidi | H04L 45/308 370/235.1 |
| 2015/0135337 A1* | 5/2015 | Fushman | G06F 16/9558 726/30 |

OTHER PUBLICATIONS

Content-Based Access Control: Use data content to assist access control for large-scale content-centric databases Wenrong Zeng;Yuhao Yang;Bo Luo 2014 IEEE International Conference on Big Data (Big Data) (Year: 2014).*
Adaptive Network Coded Clouds: High Speed Downloads and Cost-Effective Version Control Márton Sipos;Janus Heide; Daniel E. Lucani; Morten V. Pedersen; Frank H.P. Fitzek;Hassan Charaf IEEE Transactions on Cloud Computing (Year: 2019).*
Toward Cost-Effective Mobile Video Streaming via Smart Cache With Adaptive Thresholding Di Wu;Jian Huang;Jian He;Min Chen;Guoqing Zhang IEEE Transactions on Broadcasting Year: 2015 | vol. 61, Issue: 4 | Journal Article | Publisher: IEEE (Year: 2015).*
International Search Report for PCT/IB2014/064634; Blaine R. Copenheaver; dated Feb. 3, 2015.

* cited by examiner

BEGIN

APPRECIATING AN ACTIVITY PARAMETER REPRESENTATIVE OF TOTAL DOWNLOAD ACTIVITY OF A FIRST FILE FROM A CLOUD STORAGE SERVICE VIA A COMMUNICATION NETWORK, THE TOTAL DOWNLOAD ACTIVITY COMPRISING DOWNLOAD ACTIVITY VIA A FIRST HYPERLINK AND A SECOND HYPERLINK AND DOWNLOAD ACTIVITY BY A FIRST USER AND A THIRD USER;

THE FIRST FILE HAVING BEEN UPLOADED TO THE CLOUD STORAGE SERVICE BY A FIRST CLIENT DEVICE ASSOCIATED WITH THE FIRST USER VIA THE COMMUNICATION NETWORK; THE FIRST USER BEING ONE OF A PLURALITY OF USERS ASSOCIATED WITH THE CLOUD STORAGE SERVICE; THE METHOD BEING EXECUTABLE AT A SERVER HOSTING THE CLOUD STORAGE SERVICE;

THE FIRST USER HAVING SENT THE FIRST HYPERLINK FOR ACCESSING THE FIRST FILE VIA THE COMMUNICATION NETWORK TO A SECOND CLIENT DEVICE ASSOCIATED WITH A SECOND USER; THE FIRST FILE BEING FURTHER ASSOCIATED WITH A THIRD USER, THE THIRD USER HAVING UPLOADED A SECOND FILE DUPLICATIVE OF THE FIRST FILE IN THE CLOUD STORAGE SERVICE, SUCH THAT THE SECOND FILE WAS NOT STORED IN THE CLOUD STORAGE SERVICE AND AN ASSOCIATION WAS CREATED BETWEEN THE FIRST FILE AND THE THIRD USER;

THE THIRD USER HAVING SENT THE SECOND HYPERLINK FOR ACCESSING THE FIRST FILE VIA THE COMMUNICATION NETWORK TO A FOURTH CLIENT DEVICE ASSOCIATED WITH A FOURTH USER

202

RESPONSIVE TO THE ACTIVITY PARAMETER BEING ABOVE A PRE-DETERMINED THRESHOLD, APPLYING A FIRST REMEDIAL ACTION TO THE DOWNLOADING OF THE FIRST FILE VIA THE FIRST HYPERLINK AND THE SECOND HYPERLINK, WHEREIN DOWNLOADING OF THE FIRST FILE BY THE FIRST USER AND THE THIRD USER IS NOT AFFECTED

204

END

*FIG. 2*

METHOD AND SYSTEM FOR CONTROLLING DOWNLOADING OF A FILE IN A CLOUD STORAGE SERVICE

CROSS-REFERENCE

The present application claims convention priority to Russian Patent Application No. 2014110276, filed Mar. 17, 2014, entitled "A METHOD AND A SYSTEM FOR CONTROLLING DOWNLOADING OF A FILE IN A CLOUD STORAGE SERVICE" which is incorporated by reference herein in its entirety

FIELD

The present technology relates to cloud storage services in general and specifically to a system and method for controlling downloading of a file in a cloud storage service.

BACKGROUND

A cloud platform delivers computing as a service to one or more clients. For example, a cloud platform may deliver an infrastructure (e.g., storage media), provide software, or make particular computing platforms available to clients. A cloud platform does not merely connect various components as in conventional networks, but provides instead computing services and infrastructures, which are independent of the devices used by the clients (or users). Therefore, by using cloud platforms it becomes possible to delegate setting up and maintenance of computing systems to an external provider and therewith to increase significantly the efficiency, capability, or flexibility of an information technology (IT) infrastructure.

For example, a user may operate in various contexts, wherein in each of them the user plays a different role and has different responsibilities. These different roles might relate to the professional or personal life of the user in the role of employee, contractor, customer, supplier, or family member, for example. Within these various contexts, a user may use different client devices (e.g., desktop computers, laptop computers, personal computers, mobile phones, tablets, etc.) or client devices that utilize remote processing capability (e.g., applications hosted on a web site or a virtual machine hosted in a data center). Different computing environments might be installed on client devices with local processing capabilities (e.g., different operating systems, virtual software environments, Web applications, native applications, containers, BIOS/APIs, etc.) to interact with a cloud platform.

Further, various global or local communications networks (the Internet, the World Wide Web, local area networks, and the like) offer a user a vast amount of information. The information includes a multitude of contextual topics, such as but not limited to, news and current affairs, maps, company information, financial information and resources, traffic information, games and entertainment-related information. Users use a variety of client devices (desktop computers, laptop computers, notebooks, smartphones, tablets, and the like) to have access to rich content (such as images, audio, video, animation, and other multimedia content from such networks).

Generally speaking, a given user can access computing services on a cloud platform regardless of predetermined hardware/software systems and communications networks in use. A user can access a cloud platform via a communications network by two principle means. A given user can access a particular resource directly, either by typing an address of the resource (typically an Universal Resource Locator (URL), such as www.webpage.com) or by clicking a link in an e-mail or in another web resource.

A given user may use a cloud platform for file storage purposes. Typically, a user may use a cloud storage service to store files for a multitude of purposes, such as data archival, ease of access to the file irrespective of location or time, sharing of the file with other users, and the like. A variety of files may be stored on a cloud storage service, including files used for personal or professional use, such as data files, portable document format (pdf) files, word processing files, text files, images, photographs, multimedia content for entertainment purposes, and the like. In some instances files containing copyrighted material may be stored, such as audio, video, animation, literary, artistic, and other such materials.

In cloud storage services, various problems have to be solved. It is important that a cloud storage service is able to manage applications and associated policies which are provided to users. For example, a cloud storage service should be able to monitor and control use of the service to protect intellectual property of third-party content providers and to prevent illegal or otherwise inappropriate activities, such as piracy or other illegal downloading and file-sharing activities. As another example, it is important for a cloud storage service to provide consistent performance parameters to a plurality of users, such as a desired amount of available channel bandwidth, download speed, upload speed, storage space, and other such performance characteristics. Frequent downloading of large files by one or more users can have a detrimental impact on performance parameters for other users who are also using the cloud storage service, for example by consuming an excessive amount of channel bandwidth. It is important therefore for a cloud storage service to manage client use in order to maintain desired performance standards.

US 2014/0010082 (Sarkar et al.) teaches a computer-implemented method for prevention of bandwidth abuse of a communications system. The method includes providing a user with an initial number of credits, where the credits are consumed by downloading data. As the user consumes the credits, the data being downloaded is checked to determine if it is permissible or non-permissible data, non-permissible data including file-sharing files and movie downloads if user subscription does not permit such activity. If the data is permissible, the user is provided another allotment of credits equal to the initial allotment. If the data is non-permissible, the user is provided an allotment of credits less than the initial allotment, and various restriction policies can also be applied, such as levying additional fees and/or terminating the user's access to the channel.

SUMMARY

It is an object of the present technology to ameliorate at least some of the inconveniences present in the prior art. Embodiments of the present technology have been developed based on inventors' appreciation that there is a need for systems and methods for controlling client use of cloud-based resources, such as controlling downloading of files in a cloud storage service.

In one aspect, implementations of the present technology provide a method of controlling downloading of a first file in a cloud storage service, the first file having been uploaded to the cloud storage service by a first client device associated with a first user via a communication network; the first user being one of a plurality of users associated with the cloud storage service; the method being executable at a server hosting the cloud storage service. In an implementation, the method includes appreciating an activity parameter representative of total download activity of the first file from the cloud storage service via the communication network; and, responsive to the activity parameter being above a pre-determined threshold, applying a first remedial action to the downloading of the first file. In a further implementation, the first user sends a first hyperlink for accessing the first file via the communication network to a second client device associated with a second user; the total download activity comprises download activity via the first hyperlink and download activity by the first user; and the first remedial action is applied only to downloading of the first file via the first hyperlink, such that downloading of the first file by the first user is not affected.

In some implementations, a second file is uploaded by a third client device associated with a third user via the communication network, the second file being compared after uploading to the first file using a deduplication process; if the second file is not duplicative of the first file in the cloud storage service, then the second file is stored in the cloud storage service in association with the third user, however, if the second file is duplicative of the first file in the cloud storage service, then the second file is not stored in the cloud storage service, and an association is created between the first file and the third user. In a further implementation, the third user sends a second hyperlink for accessing the first file via the communication network to a fourth client device associated with a fourth user; the total download activity comprises download activity via the first hyperlink and the second hyperlink and download activity by the first user and the third user; and the first remedial action is applied only to downloading the first file via the first hyperlink and the second hyperlink, such that downloading of the first file by the first user and the third user is not affected.

In some implementations, after the first remedial action has been applied, the method includes appreciating a second activity parameter representative of total download activity of the first file from the cloud storage service via the communication network, the appreciating of the second activity parameter being implemented at a pre-determined period of time after said appreciating of said activity parameter; and, responsive to the second activity parameter being above the pre-determined threshold, applying a second remedial action to the downloading of the first file by any one of the first user and the third user.

In some implementations, after the first remedial action has been applied, the method includes appreciating a second activity parameter representative of total download activity of the first file from the cloud storage service via the communication network, the appreciating of the second activity parameter being implemented at a pre-determined period of time after said appreciating of said activity parameter; responsive to the second activity parameter being above the pre-determined threshold, appreciating a third activity parameter and a fourth activity parameter representative of download activity of the first file from the cloud storage service via the communication network by the first user and the third user, respectively; and, responsive to any one of the third activity parameter and the fourth activity parameter being above a second pre-determined threshold, applying a second remedial action to the downloading of the first file by any one of the first user and the third user, respectively.

In an implementation, there is provided a method of controlling downloading of a first file in a cloud storage service, the first file having been uploaded to the cloud storage service by a first client device associated with a first user via a communication network; the first user being one of a plurality of users associated with the cloud storage service; the method being executable at a server hosting the cloud storage service; wherein the first user has sent a first hyperlink for accessing the first file via the communication network to a second client device associated with a second user; wherein the first file is further associated with a third user, the third user having uploaded a second file duplicative of the first file in the cloud storage service, such that the second file was not stored in the cloud storage service and an association was created between the first file and the third user (e.g., using a deduplication process); wherein the third user has sent a second hyperlink for accessing the first file via the communication network to a fourth client device associated with a fourth user; wherein the method includes: appreciating an activity parameter representative of total download activity of the first file from the cloud storage service via the communication network, the total download activity comprising download activity via the first hyperlink and the second hyperlink and download activity by the first user and the third user; and, responsive to the activity parameter being above a pre-determined threshold, applying a first remedial action to the downloading of the first file via the first hyperlink and the second hyperlink, wherein downloading of the first file by the first user and the third user is not affected. In some implementations, after the first remedial action has been applied to the downloading of the first file via the first hyperlink and the second hyperlink, the method includes appreciating a second activity parameter representative of total download activity of the first file from the cloud storage service via the communication network, the appreciating of the second activity parameter being implemented at a pre-determined period of time after said appreciating of said activity parameter; and, responsive to the second activity parameter being above a second pre-determined threshold, applying a second remedial action to the downloading of the first file by any one of the first user and the third user. In some alternative implementations, after the first remedial action has been applied to the downloading of the first file via the first hyperlink and the second hyperlink, the method includes appreciating a second activity parameter representative of total download activity of the first file from the cloud storage service via the communication network, the appreciating of the second activity parameter being implemented at a pre-determined period of time after said appreciating of said activity parameter; responsive to the second activity parameter being above a second pre-determined threshold, appreciating a third activity parameter and a fourth activity parameter representative of download activity of the first file from the cloud storage service via the communication network by the first user and the third user, respectively; and, responsive to any one of the third activity parameter and the fourth activity parameter being above either the pre-determined threshold or the second pre-determined threshold, applying a second remedial action to the downloading of the first file by any one of the first user and the third user, respectively.

In an aspect, implementations of the present technology provide a server configured to control downloading of a first file in a cloud storage service, the server hosting the cloud storage service, the first file having been uploaded to the cloud storage service by a first client device associated with a first user via a communication network; the first user being one of a plurality of users associated with the cloud storage service; wherein the server is configured to appreciate an activity parameter representative of total download activity of the first file from the cloud storage service via the communication network; and, responsive to the parameter being above a pre-determined threshold, apply a first remedial action to the downloading of the first file.

In some implementations, a server is further configured to apply the first remedial action only to downloading of the first file via a first hyperlink for accessing the first file via the communication network, the first hyperlink having been sent by the first user to a second client device associated with a second user; the total download activity comprising download activity via the first hyperlink and download activity by the first user; such that downloading of the first file by the first user is not affected by the remedial action.

In some implementations, a server is further configured to apply the first remedial action to downloading of the first file via the first hyperlink and a second hyperlink for accessing the first file via the communication network; the second hyperlink having been sent by a third user to a fourth client device associated with a fourth user, the third user having uploaded a second file duplicative of the first file in the cloud storage service, such that the second file was not stored in the cloud storage service and an association was created between the first file and the third user (e.g., using a deduplication process); the total download activity comprising download activity via the first hyperlink and the second hyperlink and download activity by the first user and the third user; such that downloading of the first file by the first user and the third user is not affected by the first remedial action. In some alternative implementations, a server is further configured to, after the first remedial action has been applied, appreciate a second activity parameter representative of total download activity of the first file from the cloud storage service via the communication network, the appreciating of the second activity parameter being implemented at a pre-determined period of time after said appreciating of said activity parameter; and, responsive to the second activity parameter being above the pre-determined threshold, apply a second remedial action to the downloading of the first file by any one of the first user and the third user. In some alternative implementations, a server is further configured to, after the first remedial action has been applied, appreciate a second activity parameter representative of total download activity of the first file from the cloud storage service via the communication network, the appreciating of the second activity parameter being implemented at a pre-determined period of time after said appreciating of said activity parameter; responsive to the second activity parameter being above the pre-determined threshold, appreciate a third activity parameter and a fourth activity parameter representative of download activity of the first file from the cloud storage service via the communication network by the first user and the third user, respectively; and, responsive to any one of the third and fourth activity parameter being above a second pre-determined threshold, apply a second remedial action to the downloading of the first file by any one of the first user and the third user, respectively.

In some implementations, there is provided a server configured to control downloading of a first file in a cloud storage service, the server hosting the cloud storage service, the first file having been uploaded to the cloud storage service by a first client device associated with a first user via a communication network; the first user being one of a plurality of users associated with the cloud storage service; wherein the first user has sent a first hyperlink for accessing the first file via the communication network to a second client device associated with a second user; wherein the first file is further associated with a third user, the third user having uploaded a second file duplicative of the first file in the cloud storage service, such that the second file was not stored in the cloud storage service and an association was created between the first file and the third user (e.g., using a deduplication process); wherein the third user has sent a second hyperlink for accessing the first file via the communication network to a fourth client device associated with a fourth user; and wherein the server is configured to: appreciate an activity parameter representative of total download activity of the first file from the cloud storage service via the communication network, the total download activity comprising download activity via the first hyperlink and the second hyperlink and download activity by the first user and the third user; and, responsive to the activity parameter being above a pre-determined threshold, apply a first remedial action to the downloading of the first file via the first hyperlink and the second hyperlink, wherein downloading of the first file by the first user and the third user is not affected. In some implementations, the server is further configured to, after the first remedial action has been applied to the downloading of the first file via the first hyperlink and the second hyperlink, appreciate a second activity parameter representative of total download activity of the first file from the cloud storage service via the communication network, the appreciating of the second activity parameter being implemented at a pre-determined period of time after said appreciating of said activity parameter; and, responsive to the second activity parameter being above a second pre-determined threshold, apply a second remedial action to the downloading of the first file by any one of the first user and the third user. In some implementations, the server is further configured to, after the first remedial action has been applied to the downloading of the first file via the first hyperlink and the second hyperlink, appreciate a second activity parameter representative of total download activity of the first file from the cloud storage service via the communication network, the appreciating of the second activity parameter being implemented at a pre-determined period of time after said appreciating of said activity parameter; responsive to the second activity parameter being above the pre-determined threshold, appreciate a third activity parameter and a fourth activity parameter representative of download activity of the first file from the cloud storage service via the communication network by the first user and the third user, respectively; and, responsive to any one of the third activity parameter and the fourth activity parameter being above the pre-determined threshold, applying a second remedial action to the downloading of the first file by any one of the first user and the third user, respectively.

In implementations provided herein, a server may be an individual server or a plurality of servers.

In some implementations, an activity parameter is the number of times a first file is downloaded. In some implementations, an activity parameter is the number of different users downloading a first file. In some implementations, an activity parameter is the bandwidth occupied by the total download activity of the first file from the cloud storage service via the communication network. In some implementations, an activity parameter is a combination of at least two of the following: the number of times the first file is downloaded, the number of different users downloading the first file, and the bandwidth occupied by the total download activity of the first file from the cloud storage service via the communication network. A second activity parameter, third activity parameter, and fourth activity parameter may also be any one of the foregoing, or a combination thereof. A first activity parameter, second activity parameter, third activity parameter, and fourth activity parameter may be selected independently of each other, and may be the same or different.

In some implementations, a pre-determined threshold is the first file being downloaded at least 100 times. In some implementations, a pre-determined threshold is the first file being downloaded at least 300 times. In some implementations, a pre-determined threshold is the first file being downloaded by at least 100 different users. In some implementations, a pre-determined threshold is the first file being downloaded by at least 300 different users. In some implementations, a pre-determined threshold is at least 100 GB of bandwidth occupied by the total download activity of the first file from the cloud storage service via the communication network. In some implementations, a pre-determined threshold is a combination of the foregoing. A second pre-determined threshold may also be any one of the foregoing, or a combination thereof. A first and a second pre-determined threshold may be the same or different.

In some implementations, a pre-determined period of time is at least one day. In some implementations, a pre-determined period of time is at least one week. A first and a second pre-determined period of time may be the same or different.

Similarly, a first hyperlink and a second hyperlink may be the same or different.

In some implementations, a remedial action is reducing speed of the downloading activity. In some implementations, a remedial action is not allowing the downloading activity. Non-limiting examples of not allowing the downloading activity include removing or deactivating a button for downloading a file, a button for previewing a file, or a hyperlink for accessing a file. In some implementations, a remedial action comprises restricting downloading activity to between the hours of 10 pm and 6 am in the user's local time zone. In some implementations, a remedial action is a combination of the foregoing. A first and a second remedial action may be the same or different.

In some implementations, applying a remedial action is executed at a server. In some implementations, applying a remedial action includes generating a trigger; a server sending the trigger via the communication network to a second client device and a fourth client device; and the trigger causing the second client device and the fourth client device to apply the remedial action to the downloading of the first file by the second user and the fourth user, respectively, via the first hyperlink and the second hyperlink, respectively. In some implementations, applying a remedial action includes generating a trigger; a server sending the trigger via the communication network to a second client device; and the trigger causing the second client device to apply the remedial action to the downloading of the first file by the second user via the first hyperlink In some implementations, total download activity includes download activity by a first user, a second user, a third user, and a fourth user; in other words, total download activity can include download activity by all users, including registered (first user and third user being examples of registered users) and public (second user and fourth user being examples of public users) users. In alternative implementations, total download activity includes download activity by a second user and a fourth user only; in other words, total download activity includes only download activity by users using a hyperlink to access a file, i.e., public users.

In some implementations of the present technology, there are provided methods and systems for controlling downloading of a first file in a cloud storage service, the first file having been uploaded to the cloud storage service by a first client device associated with a first user via a communication network; the first user being one of a plurality of users associated with the cloud storage service; the method being executable at a server hosting the cloud storage service; wherein the first user has sent a first hyperlink for accessing the first file via the communication network to a second client device associated with a second user; wherein the first file is further associated with a third user, the third user having uploaded a second file duplicative of the first file in the cloud storage service, such that the second file was not stored in the cloud storage service and an association was created between the first file and the third user; the first user and the third user being registered users of the cloud storage service, and the second user and the fourth user being public users; wherein the third user has sent a second hyperlink for accessing the first file via the communication network to a fourth client device associated with a fourth user; the method comprising appreciating an activity parameter representative of total download activity of the first file from the cloud storage service via the communication network, the total download activity comprising download activity via the first hyperlink and the second hyperlink and download activity by the first user and the third user (i.e., the total download activity comprising download activity by both registered users and public users); and, responsive to the activity parameter being above a pre-determined threshold, applying a first remedial action to the downloading of the first file via the first hyperlink and the second hyperlink, wherein downloading of the first file by the first user and the third user is not affected (i.e., downloading of the first file by the registered users is not affected).

In some implementations, after the first remedial action has been applied to the downloading of the first file via the first hyperlink and the second hyperlink, the method further comprises appreciating a second activity parameter representative of total download activity of the first file from the cloud storage service via the communication network, the appreciating of the second activity parameter being implemented at a pre-determined period of time after said appreciating of said activity parameter; and, responsive to the second activity parameter being above a second pre-determined threshold, applying a second remedial action to the downloading of the first file by any one of the first user and the third user (i.e., applying a second remedial action to the downloading of the first file by any one of the registered users).

In some alternative implementations, after the first remedial action has been applied to the downloading of the first file via the first hyperlink and the second hyperlink, the method further comprises appreciating a second activity parameter representative of total download activity of the first file from the cloud storage service via the communication network, the appreciating of the second activity parameter being implemented at a pre-determined period of time after said appreciating of said activity parameter; responsive to the second activity parameter being above a second pre-determined threshold, appreciating a third activity parameter and a fourth activity parameter representative of download activity of the first file from the cloud storage service via the communication network by the first user and the third user, respectively (i.e., by the registered users); responsive to any one of the third activity parameter and the fourth activity parameter being above any one of said pre-determined threshold and the second pre-determined threshold, applying a second remedial action to the downloading of the first file by any one of the first user and the third user (i.e., any one of the registered users), respectively.

It should be expressly understood that in implementations of the technology, total download activity may include total download activity by all users, including both registered and public users, or alternatively, in some implementations may include only total download activity by registered users or only total download activity by public users. It should also be understood that a pre-determined threshold may be set independently for registered users and public users; a pre-determined threshold (e.g., a download limit) for registered users may be the same as or different from a pre-determined threshold for public users. Similarly, a remedial action may be applied only to download activity by public users, only to download activity by registered users, or to both, and a remedial action applied to a registered user may be the same as or different from a remedial action applied to a public user.

In another aspect, implementations of the present technology provide methods and systems for controlling download of a copyrighted material, the copyrighted material being found in a first file in a cloud storage service, the first file having been uploaded to the cloud storage service by a first client device associated with a first user via a communication network, the first user being one of a plurality of users associated with the cloud storage service, and the method being executable at a server hosting the cloud storage service. The method includes appreciating an activity parameter representative of total download activity of the first file from the cloud storage service via the communication network, the total download activity comprising download activity via a first hyperlink and a second hyperlink and download activity by the first user and the third user; and, responsive to the activity parameter being above a pre-determined threshold, applying a first remedial action to the downloading of the first file via the first hyperlink and the second hyperlink, wherein downloading of the first file by the first user and the third user is not affected; wherein the first user has sent a first hyperlink for accessing the first file via the communication network to a second client device associated with a second user; wherein the first file is further associated with a third user, the third user having uploaded a second file duplicative of the first file in the cloud storage service, such that the second file was not stored in the cloud storage service and an association was created between the first file and the third user (e.g., using a deduplication process); and wherein the third user has sent a second hyperlink for accessing the first file via the communication network to a fourth client device associated with a fourth user. In some implementations, the method further includes, after the first remedial action has been applied to the downloading of the first file via the first hyperlink and the second hyperlink, appreciating a second activity parameter representative of total download activity of the first file from the cloud storage service via the communication network, the appreciating of the second activity parameter being implemented at a pre-determined period of time after said appreciating of said activity parameter; and, responsive to the second activity parameter being above a second pre-determined threshold, applying a second remedial action to the downloading of the first file by any one of the first user and the third user. In alternative implementations, the method further includes, after the first remedial action has been applied to the downloading of the first file via the first hyperlink and the second hyperlink, appreciating a second activity parameter representative of total download activity of the first file from the cloud storage service via the communication network, the appreciating of the second activity parameter being implemented at a pre-determined period of time after said appreciating of said activity parameter; responsive to the second activity parameter being above a second pre-determined threshold, appreciating a third activity parameter and a fourth activity parameter representative of download activity of the first file from the cloud storage service via the communication network by the first user and the third user, respectively; and, responsive to any one of the third activity parameter and the fourth activity parameter being above the pre-determined threshold, applying a second remedial action to the downloading of the first file by any one of the first user and the third user, respectively.

In another aspect, implementations of the present technology provide a non-transitory computer readable storage medium storing instructions, which when executed by at least one processor causes performance of: appreciating an activity parameter representative of total download activity of a first file from a cloud storage service via a communication network, the first file having been uploaded to the cloud storage service by a first client device associated with a first user via the communication network; the first user being one of a plurality of users associated with the cloud storage service; wherein the first user has sent a first hyperlink for accessing the first file via the communication network to a second client device associated with a second user; wherein the first file is further associated with a third user, the third user having uploaded a second file duplicative of the first file in the cloud storage service, such that the second file was not stored in the cloud storage service and an association was created between the first file and the third user (e.g., using a deduplication process); wherein the third user has sent a second hyperlink for accessing the first file via the communication network to a fourth client device associated with a fourth user; the total download activity comprising download activity via the first hyperlink and the second hyperlink and download activity by the first user and the third user; and, responsive to the activity parameter being above a pre-determined threshold, applying a first remedial action to the downloading of the first file via the first hyperlink and the second hyperlink, wherein downloading of the first file by the first user and the third user is not affected.

In some implementations, the computer readable storage medium further causes performance of: after the first remedial action has been applied to the downloading of the first file via the first hyperlink and the second hyperlink, appreciating a second activity parameter representative of total download activity of the first file from the cloud storage service via the communication network, the appreciating of the second activity parameter being implemented at a pre-determined period of time after said appreciating of said activity parameter; and, responsive to the second activity parameter being above a second pre-determined threshold, applying a second remedial action to the downloading of the first file by any one of the first user and the third user.

In some alternative implementations, the computer readable storage medium further causes performance of: after the first remedial action has been applied to the downloading of the first file via the first hyperlink and the second hyperlink, appreciating a second activity parameter representative of total download activity of the first file from the cloud storage service via the communication network, the appreciating of the second activity parameter being implemented at a pre-determined period of time after said appreciating of said activity parameter; responsive to the second activity parameter being above a second pre-determined threshold, appreciating a third activity parameter and a fourth activity parameter representative of download activity of the first file from the cloud storage service via the communication network by the first user and the third user, respectively; and, responsive to any one of the third activity parameter and the fourth activity parameter being above the pre-determined threshold, applying a second remedial action to the downloading of the first file by any one of the first user and the third user, respectively.

In the context of the present specification, a "server" is a computer program that is running on appropriate hardware and is capable of receiving requests (e.g., from client devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, a "client device" is any computer hardware that is capable of running software appropriate to the relevant task at hand. Thus, some non-limiting examples of client devices include personal computers (e.g., desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. In some embodiments, a file-user map is a type of database including, for example, a file identification number or name; identification of the users associated with the file; and a flag to indicate relevant download activity for the file, such as an indication that a pre-determined threshold of download activity has been reached or exceeded.

In the context of the present specification, the expression "file" includes a file containing information of any nature or kind whatsoever capable of being stored in a computer system. This information includes, but is not limited to audiovisual works (images, movies, sound records, presentations etc.), data (location data, numerical data, etc.), text (opinions, comments, questions, messages, etc.), documents, spreadsheets, etc. Any type of file format for encoding information capable of storage in a computer system is included; non-limiting examples of such file formats include archive file formats, bibliography file formats, chemical file formats, debugging data formats, dictionary formats, email storage formats, executable file formats, font formats, graphics file formats, office document file formats, playlist file formats, spreadsheet file formats, text file formats, audiovisual file formats, and the like.

In the context of the present specification, the expression "computer usable information storage medium" is intended to include media of any nature and kind whatsoever. Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROMs (CD-ROMs), digital versatile disks (DVDs) or other optical storage, floppy disks, hard drives, magnetic cassettes, magnetic tape, magnetic disk storage or other magnetic storage devices, USB keys, solid state-drives, tape drives, or any other medium that can be used to store the desired information and that can be accessed to retrieve that information.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the expression "cloud storage service" is intended to include computing facilities where multiple clients, client devices, communities, IT domains, and/or applications are managed or administrated separately in a multi-tenant-environment. A "cloud" environment relates to a structure wherein multiple independent users share a common set of infrastructure, platforms, services/applications, or resources in a manner that isolates them from each other securely. A user/client may be a company, an organization, or a private person, and a client device may refer to any of a range of end-user client devices, as described herein. Such a cloud service provides connectivity to be used, for example, by personal computers, tablets, smart phones, or other end user-connected devices (home entertainment, etc.). Many types of cloud services are known. For example, a cloud service may comprise decoupled administration models applicable to server blades in a data center, or any distribution of connected devices. The common set of infrastructure, platforms, services/applications, or resources is typically managed by an administrator, which manages and maintains the cloud service. Cloud-based resources may be public or private.

In the context of the present specification, the expression "download" is intended to include transfer or copy of data from one computer system to another or to a disk. Typically, "downloading" refers to receiving data to a local system from a remote system, or to initiation of such a data transfer.

Generally, when downloading data, the data is only usable when it has been received in its entirety. The data may be simply received, or may be received and saved locally. As used herein, the term "downloading" is intended to include "streaming," which indicates the receiving of data that is used near immediately as it is received, while the transmission is still in progress and which may not be stored long-term. The term "downloading" is also intended to include a combination of traditional downloading and streaming such as "side-loading" in which a media program is loaded in parallel with a playing of the media program or another media program.

In the context of the present specification, the expression "upload" is intended to include the sending of data from a local system to a remote system such as a server with the intent that the remote system should store a copy of the data being transferred, or the initiation of such a process. As used herein, the term "uploading" is intended to include "remote uploading," in which there is a transfer of data from a remote system to another remote system, i.e., the data being uploaded need not be located on a user's local network.

As used herein, "media program" may refer to media data containing audio content including but not limited to any of: audio data, audio transcription data, audiovisual data, multimedia data, internet downloaded content data, multimedia data with markup language pages, videos, movies, multimedia presentations, audio books, electronic books, podcasts, etc. A media data unit may refer to a data unit containing audio data including but not limited to audio samples, audio transcription data that may be used for voice synthesis, audio data units, audiovisual data units, media data segments, image frames, etc. Media data may be received by a system as described herein using one or more of wire-based links or wireless links Media data may be received in the form of a media file, a media data stream, etc. Media data may be received with any of a wide variety of formats defined by standard or proprietary specifications including but not limited to any related to CD, MPEG-1, MPEG-2, and MPEG-2.5 Audio Layer III (MP3), Advanced Audio Coding (AAC), DVD, HD DVD, Blu-ray Disc, H.261, H.263, H.264/MPEG-4, etc. A media program may or may not contain copyrighted material.

In the context of the present specification, the expression "copyrighted material" is intended to include material which is copyright protected, such as an artistic work, a literary work, a photograph, an audiovisual work, a video, a software code, and the like. A file containing copyrighted material may only be copied without limitation legally if digital rights are obtained by the user. "Digital rights" as described herein include but are not limited to any of playing rights, copying rights, distribution rights, recording rights, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first user" and "third user" is not intended to imply any particular order, type, chronology, hierarchy or ranking (for example) of/between the users, nor is their use (by itself) intended to imply that any "second user" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 is a block diagram depicting a method 200, the method 200 being implemented within the system 100 of FIG. 1 and being implemented according with non-limiting embodiments of the present technology.

DETAILED DESCRIPTION

Figure 1:
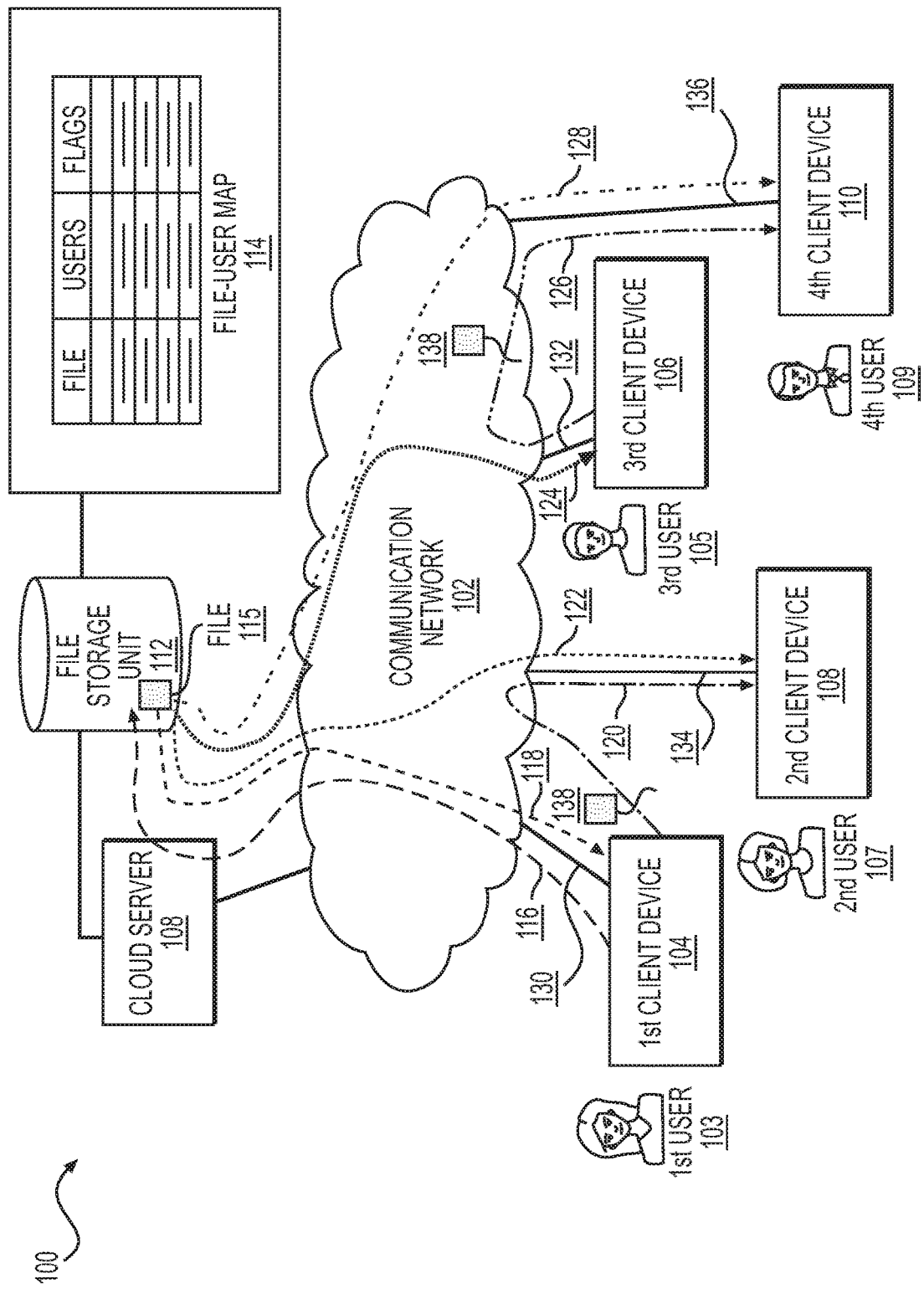
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a communication network 102. The communication network 102 is typically associated with a plurality of client devices associated respectively with a plurality of users. A first client device 104, a second client device 108, a third client device 106, and a fourth client device 110 associated with a first user 103, a second user 107, a third user 105, and a fourth user 109, respectively, are indicated in the figure for illustrative purposes. It should be noted that the fact that the client devices are associated with specific users does not need to suggest or imply any mode of operation—such as a need to log in, a need to be registered or the like.

The communication network 102 is also associated with a cloud server 108. The cloud server 108 hosts a cloud storage service and is typically associated with a file storage unit 112. The implementation of the cloud server 108 is not particularly limited, but as an example, the cloud server 108 may be implemented as a single server. Alternatively, the cloud server 108 can be implemented as a plurality of servers. Within the latter embodiments, each of the plurality of servers implementing the cloud server 108 may be responsible for storing files from users in a particular region; or a particular type of users; or a particular type or size of files. Alternatively, each of the plurality of servers implementing the cloud server 108 may be configured to store files according to a load-balancing approach executed by a supervisory entity (which can be one of the plurality of servers). The file storage unit 112 is typically a unit capable of storing files and data. A file 115 stored in the file storage unit is shown for illustrative purposes. Like the cloud server 108, the file storage unit 112 may be implemented as a single unit, or alternatively as a plurality of units.

The file storage unit 112 is typically associated with a file-user map 114. A file-user map 114 will typically include a file identification number or name; identification of the users associated with the file (to be described in greater detail herein below); and a flag to indicate relevant download activity for the file, such as an indication that a pre-determined threshold of download activity has been reached or exceeded. A flag in a file-user map can be information associated with a file indicating applicable download limits (e.g., a pre-determined threshold that has been set for a particular file), download activity, type and duration of remedial actions which have been applied, status (e.g., whether or not a remedial action has been applied to a particular file), etc., or any combination thereof.

Implementation of a file-user map is not particularly limited. The file-user map 114 may be stored in the file storage unit 112 or the cloud server 108 or some combination thereof.

At least one data transmittal path is typically associated with each user, illustrating transmittal of data by the user in the communication network 102 (when such user is active on the communication network 102—i.e., when the user uploads or downloads files or performs other activity on the communication network 102). Data transmittal path 116 illustrates upload of a file 115 by the first user 103 to the cloud storage service (including the cloud server 108 and file storage unit 112) via the communication network 102. Data transmittal path 118 illustrates download of the file 115 by the first user 103 from the cloud storage service (including the cloud server 108 and file storage unit 112) via the communication network 102, for example, when the first user 103 is desirous of accessing their previously-uploaded file.

Data transmittal path 120 illustrates sending, by the first user 103 using the first client device 104, of a hyperlink 138 for accessing the file 115 via the communication network 102, to a second client device 108 associated with a second user 107. Data transmittal path 122 illustrates downloading of the file 115 by the second user 107 to the second client device 108 via the communication network 102, the downloading by the second user 107 being via the hyperlink 138 provided by the first user 103.

Data transmittal path 124 illustrates an uploading of the file 115 by the third client device 106 of the third user 105. Data transmittal path 126 illustrates sending of a hyperlink 138 for accessing the file 115 via the communication network 102 to a fourth client device 110 associated with a fourth user 109. Data transmittal path 128 illustrates downloading of the file 115 by the fourth user 109 to the fourth client device 110 via the communication network 102, the downloading by the fourth user 109 being via the hyperlink 138 provided by the third user 105. It is intended that data transmittal paths illustrated in FIG. 1 are exemplary only, and that many other such data transmittal paths between a plurality of users are possible.

In the implementation illustrated in FIG. 1, the first user 103 and the third user 105 send the same hyperlink 138 to client devices 108 and 110, respectively. In some embodiments of the present technology, the hyperlink 138 sent by the first user 103 and the third user 105 are the same, as depicted in FIG. 1. However, it should be understood that in some embodiments, different users may send different hyperlinks (not depicted) to other users. In other words, in some embodiments (not shown), the first user 103 and the third user 105 send different hyperlinks to client devices 108 and 110, respectively, for accessing file 115 via the communication network 102. It should be expressly understood that in implementations of the technology, separate hyperlinks may be independent of each other, i.e., a first hyperlink may be the same as or different from a second hyperlink Client devices 104, 106, 108 and 110 are coupled to communication network 102 via respective communication link 130, 132, 134, 136. In some non-limiting embodiments of the present technology, the communication network 102 can be implemented as the Internet. In other embodiments of the present technology, the communication network 102 can be implemented differently, such as any wide-area communications network, local-area communications network, a private communications network and the like.

How a communication link 130, 132, 134, 136 is implemented is not particularly limited and will vary depending on how the communication network 102 and the respective client devices 104, 106, 108 and 110 are implemented. Merely as an example and not as a limitation, in those embodiments of the present technology where the first client device 104 is implemented as a wireless communication device (such as a smartphone), the communication link 130 can be implemented as a wireless data transmittal path (such as but not limited to, a 3G communications network link, a 4G communications network link, a Wireless Fidelity, or WiFi® for short, a Bluetooth®, and the like). In those examples, where the first client device 104 is implemented as a notebook computer, the communication link 130 can be either wireless (such as Wireless Fidelity, or WiFi® for short, Bluetooth® or the like) or wired (such as an Ethernet based connection). Different client devices and different data transmittal paths may be implemented independently of each other. It should be understood therefore that different client devices can be implemented differently and that data transmittal paths will vary accordingly.

It should be expressly understood that implementations for client devices 104, 106, 108, and 110, communication link 130, 132, 134, 136, and communication network 102 are provided for illustration purposes only. As such, those skilled in the art will easily appreciate other specific implementational details for these elements. As such, examples provided herein above are not meant to limit the scope of the present technology.

The cloud server 108 can be implemented as a conventional computer server. In an example of an embodiment of the present technology, the cloud server 108 is implemented as a Dell™ PowerEdge™ Server running the Microsoft™ Windows Server™ operating system. It should be understood that the cloud server 108 can be implemented in any other suitable hardware and/or software and/or firmware or a combination thereof. In the depicted non-limiting embodiment of present technology, the cloud server 108 is a single server. In alternative non-limiting embodiments of the present technology, the functionality of the cloud server 108 may be distributed and may be implemented via multiple servers, e.g., the cloud server 108 may be implemented as a plurality of servers.

The cloud server 108 is communicatively coupled (or otherwise has access) to a file storage unit 112. The general purpose of the file storage unit 112 is to store data, e.g., files, uploaded by users 103, 105, 107, and 109 to the cloud server 108. The implementation of the file storage unit 112 is not particularly limited. It should be understood that any suitable hardware for storing data may be used. In some implementations, the file storage unit 112 may be physically contiguous with the cloud server 108, i.e., they are not necessarily separate pieces of hardware, as depicted, although they may be.

In alternative non-limiting embodiments of the present technology, the file-user map 114 may be implemented as a database or a table mapping a particular file to a user (or users) who have access to or who have uploaded the particular file.

Figure 4:
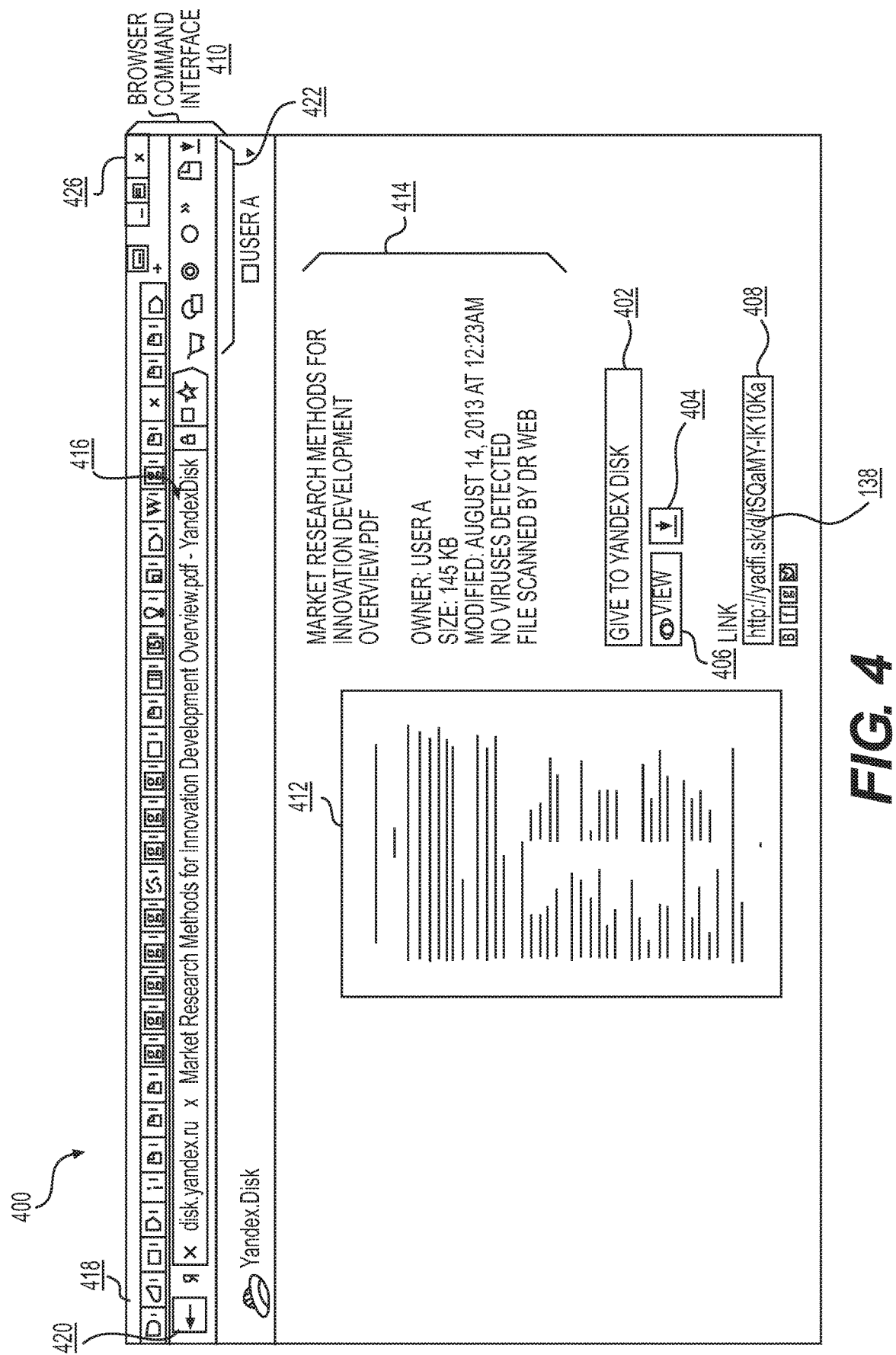
FIG. 4 depicts a screen shot 400, the screen shot 400 illustrating a standard interface for storing and downloading a file in a cloud storage service.

For further understanding and illustration of the system 100, reference is now made to FIG. 4, which depicts a screen shot 400 of a standard interface for storing, downloading or sharing a file 115 in a cloud storage service. It should be noted that FIG. 4 is for illustration purposes only to assist in understanding of the cloud storage service. It should also be understood that FIG. 4 contains a multitude of information, only relevant portions of which will be enumerated and described. The screen shot 400 shows a browser application 418 opened using an internet browser. A typical browser command interface 410 is depicted for illustrative purposes only.

The screen shot 400 shows a preview 412 of a data file and bibliographic information 414 for the file. In the depicted embodiment, the preview 412 comprises an image of a first page of the document stored in the data file. In alternative embodiments, the preview 412 may comprise an icon associated with a software application for managing the data file, an image preview of the information stored in the data file and the like.

There are also shown: an upload button 402 for uploading the file 115 to the cloud server 108; a download button 404 for downloading the file 115 from the cloud server 108; a preview button 406 for viewing the file 115 (in a pop-up preview window or the like); and a link field 408. The link field 408 is for generating a public link to the data file 115, the public link allowing other users (i.e., users other than the user who has uploaded the data file 115 to the cloud server 108) to access, view, or download the file 115. In some embodiments, such as the ones illustrated in FIG. 1 and FIG. 4, the public link generated in the link field 408 is the same as the hyperlink 138 which can be sent by users 103, 105 to users 107, 109 for accessing the file 115.

In the implementation illustrated in FIG. 4, the screen shot 400 depicts a user accessing a cloud storage service with a browser application 418. The browser application 418 has a command interface 410. The browser application 418 further comprises an address bar 416 to allow the user to type or copy-and-paste a Unified Resource Locator (URL) or, simply, an address associated with the web resource the user is looking for. The browser application 418 further comprises browser control buttons panel 422 which includes conventionally known buttons for navigating in the browser application 418 or in the internet. The browser application 418 also includes the well-known close button 426 for closing the browser application 418 and the well-known back button 420 for allowing the user to go back to one or more of the previously viewed web resources.

How the cloud storage service is accessed by a user is not particularly limited. As one example, as depicted in FIG. 4, a user may access a web site associated with the cloud server 108. For example, the cloud server 108 can be accessed by typing in an URL associated with Yandex search engine at www.yandex.ru. It should be expressly understood that cloud server 108 may be accessed using any other commercially available or proprietary search engine. Yandex browser application 418 may be used as depicted, i.e., a client device may be executing a Yandex browser application. It should be expressly understood that any other commercially available or proprietary browser application can be used for implementing non-limiting embodiments of the present technology. Further, any other suitable interface for accessing the cloud server 108 can be used.

Reference will now be made to FIG. 2, which depicts a block diagram of a method 200, the method 200 being implemented in accordance with a non-limiting embodiment of the present technology. The method 200 can be conveniently executed at the cloud server 108.

Step 202—Appreciating an Activity Parameter Representative of Total Download Activity of a First File from a Cloud Storage Service Via a Communication Network The method 200 begins at step 202, where a cloud server 108 appreciates an activity parameter representative of total download activity of file 115 via communication network 102. In some non-limiting embodiments of the present technology, an activity parameter is any suitable measure of download activity, such as but not limited to: the number of times a file is downloaded, the number of different users downloading a file, the bandwidth occupied by the total download activity of a file from the cloud storage service via the communication network, or a combination of any of these.

In some non-limiting embodiments of the present technology, total download activity refers to download activity of a particular file 115 by all users (users 103, 105, 107, 109), regardless of whether the file 115 is downloaded by a user who previously uploaded the file (user 103), or by a user who received a hyperlink 138 for accessing the file 115 from another user (user 107, 109), or by a user who is associated with the file by virtue of having uploaded a duplicative version of the file (user 105).

In alternative embodiments, total download activity refers to download activity of a particular file only by users who received a hyperlink to the file from another user, i.e., only to download activity by users 107, 109 using hyperlink 138 which was sent to client devices 108, 110 via data transmittal paths 120, 126; in other words, only to download activity by users 107, 109 via the hyperlink 138. In these embodiments, total download activity does not include downloading of the file 115 by users 103 and 105 via the data transmittal paths 118 and 124, the users 103 and 105 being users of the cloud service who have previously uploaded their respective versions of the file 115. In some embodiments, users 103 and 105 may be referred to as "registered" users of the cloud service, in contrast to users 107 and 109 who may be referred to as "public" users. As used herein, a "registered" user is intended to include users who have previously uploaded versions of the file (e.g., file 115) they are downloading. In some cases, a registered user may have subscribed or registered with a cloud storage service. As used herein, "public" users are those users who download a file (e.g., file 115) which they have not themselves uploaded, using the hyperlink 138 for accessing the file. In some cases, a public user may have subscribed or registered with a cloud storage service, although typically a public user is not a registered user or subscriber to the cloud storage service.

In the embodiment of the method 200 illustrated in FIG. 2, the total download activity comprises only download activity by users 107, 109 using hyperlink 138 via data transmittal paths 122, 128; such data transmittal paths are sometimes referred to herein as "public links", and such users 107, 109 who download file 115 using data transmittal paths 122, 128 are sometimes referred to herein as "public users." Downloading by "public users" can thus be distinguished from downloading by users who previously uploaded a particular file (i.e., user 103) or who are associated with a particular file by virtue of having uploaded a duplicative version of a file (i.e., user 105).

Implementation of the hyperlink 138 is not particularly limited. In some implementations, the hyperlink 138 is an internet address for the particular file to be loaded (typically an URL or Universal Resource Locator, such as www.webpage.com or http://yadi.sk/d/tSQaMY-IK89Ks (depicted in FIG. 4 as the hyperlink 138 in the link field 408). In some implementations, the hyperlink 138 is a reference to data composed of a word, a group of words, a string of text, or an image, that a user can click on to access a document. Implementation of the hyperlink 138 is not intended to be limited. In some implementations, the various data transmittal paths described above are used to send the hyperlink 138 from one user to another. It will be appreciated by a person of skill in the art that other implementations are possible, and any such implementation is intended to be included.

Continuing in the first step 202 of the method 200 depicted in FIG. 2, a first user 103 has sent the hyperlink 138 via a data transmittal path 120 for accessing a file 115 via the communication network 102 to the second client device 108 associated with the second user 107. The file 115 is further associated with a third user 105, the third user 105 having uploaded a second file duplicative of the file 115 in the cloud storage service, such that the second file was not stored in the cloud storage service and an association was created between the file 115 and the third user 105 in the file-user map 114. Typically, in a cloud storage service, in order to avoid unnecessary use of storage space, administrators of the cloud server 108 try to avoid storing duplicate copies of the same file. Accordingly, when a user uploads a file, the file will undergo a deduplication process, in which the file is checked to determine whether it is duplicative of another file which is already stored on the cloud storage service. If a file is found to be duplicative, then rather than storing a second copy of the same file, the user uploading the duplicative copy will simply be associated with the first copy of the file which is already stored on the cloud storage service. An entry is created in the file-user map 114 to associate the user who has uploaded the file with the file name. Deduplication systems are known in the art, such as that described in U.S. Patent Application Publication No. 2011/0225129. It is intended that any suitable deduplication system can be used in implementations of the present technology. In one specific embodiment of the present technology, the deduplication process uses a checksum algorithm.

Thus, when the third user 105 uploads a new file (not shown) via communication network 102 to the cloud server 108, the new file is checked to determine whether it is duplicative of file 115 already stored in the cloud storage service. If the new file uploaded by the third user 105 is found not to be duplicative of file 115, then it is stored in the cloud storage service; the third user 105 can then subsequently download the new file, and can send a hyperlink for accessing the new file to other users. Alternatively, if the new file uploaded by the third user 105 is found to be duplicative of file 115 already stored in the cloud storage service, then the new file is not stored in the cloud storage service, and user 105 is associated with the file 115 using an appropriate entry in the file-user map 114; the third user 105 can then download the file 115 via the data transmittal path 124, and can send the hyperlink 138 for accessing the file 115 to client device 110 associated with the fourth user 109 via the second data transmittal path 126.

Continuing in the first step 202 of the method 200 depicted in FIG. 2, the third user 105 has sent the hyperlink 138 for accessing the file 115 via data transmittal path 126 to the fourth client device 110 associated with the fourth user 109. The fourth user 109 could then download the file 115 via data transmittal path 128 using the hyperlink 138. In some implementations of the technology, the first user 103 and the third user 105 send the same hyperlink 138 to client devices 108 and 110, respectively, as illustrated in FIG. 1. However, it should be expressly understood that in other implementations (not shown), the first user 103 and the third user 105 may send different hyperlinks to client devices 108 and 110, respectively, for accessing file 115 (or other respective files, which may be different files) via the communication network 102. In other words, a first hyperlink and a second hyperlink need not be the same, although they may be.

Step 204—Responsive to the Activity Parameter Being Above a Pre-Determined Threshold, Applying a First Remedial Action to the Downloading of the First File Via the First Hyperlink and the Second Hyperlink, wherein Downloading of the First File by the First User and the Third User is Not Affected In step 204 of the method 200, a remedial action is applied to the downloading of the file 115 using the hyperlink 138 via the data transmittal path 122 and the data transmittal path 128, if the activity parameter is above a pre-determined threshold, wherein downloading of the file 115 by the first user 103 and the third user 105 via data transmittal paths 118 and 124, respectively, is not affected by the remedial action.

In implementations of the technology, a remedial action is not particularly limited. The term "remedial action" is intended to include any action which regulates, reduces, lessens, slows, or in any other way controls downloading of the file 115. In some implementations, a remedial action is reducing speed of downloading activity. In some implementations, a remedial action is not allowing downloading activity, for example by removing or deactivating a button for downloading a file, removing or deactivating a button for previewing a file, or removing or blocking a data transmittal path for accessing a file. In some implementations, a remedial action comprises restricting downloading activity to between the hours of 10 pm and 6 am in the user's local time zone. A combination of any of the foregoing may also be used. Many remedial actions for controlling, limiting or not allowing downloading are known, and any such suitable remedial actions are intended to be included. In some implementations, a remedial action may comprise denying a request from a client device 104, 106, 108, 110 to download a file 115, or alternatively, for example in the case of a media program, downloading only a version embedded with advertisements, commercials, a trailer, a highlight, or an abbreviated version of the media program to the client device 104, 106, 108, 110.

In some implementations, applying a remedial action is executed at the cloud server 108. In some implementations, applying a remedial action includes generating a trigger by the cloud server 108 and sending, by the cloud server 108, the trigger via the communication network 102 to the client devices 104, 106, 108, 110; and the trigger causing the client devices 104, 106, 108, 110 to apply the remedial action to the downloading of the file 115 by the users 103, 105, 107, 109.

A pre-determined threshold is not particularly limited. In some implementations, the pre-determined threshold is the file 115 being downloaded at least 100 times, the file 115 being downloaded at least 300 times, the file 115 being downloaded by at least 100 different users, the file 115 being downloaded by at least 300 different users, or at least 100 GB of bandwidth occupied by the total download activity of the file 115 from the cloud storage service via the communication network 102. A combination of any of the foregoing is also included. It is intended that any suitable pre-determined threshold may be set.

In some non-limiting embodiments of the present technology, an administrator or operator associated with the cloud server 108 may set the pre-determined threshold based on an empirical review of downloading activities and patterns. Alternatively, an administrator or operator of the cloud server 108 may set the pre-determined threshold at a certain level and then amend the pre-determined threshold from time to time, based for example, on user feedback or user test groups, or on ongoing downloading activities and patterns. In some implementations, such downloading activities and patterns may be stored in the file-user map 114, for example as a flag associated with a particular file and/or user. Other related information may also be stored in the file-user map 114, typically as a flag associated with a particular file and/or user. Non-limiting examples of such information which may be stored in the file-user map 114 include: a pre-determined threshold set for a particular file, an indication that a pre-determined threshold of download activity has been reached or exceeded, status (e.g., whether or not a remedial action has been applied to a particular file), type and duration of remedial actions which have been applied in the past or are presently being applied, or a combination thereof.

Figure 3:
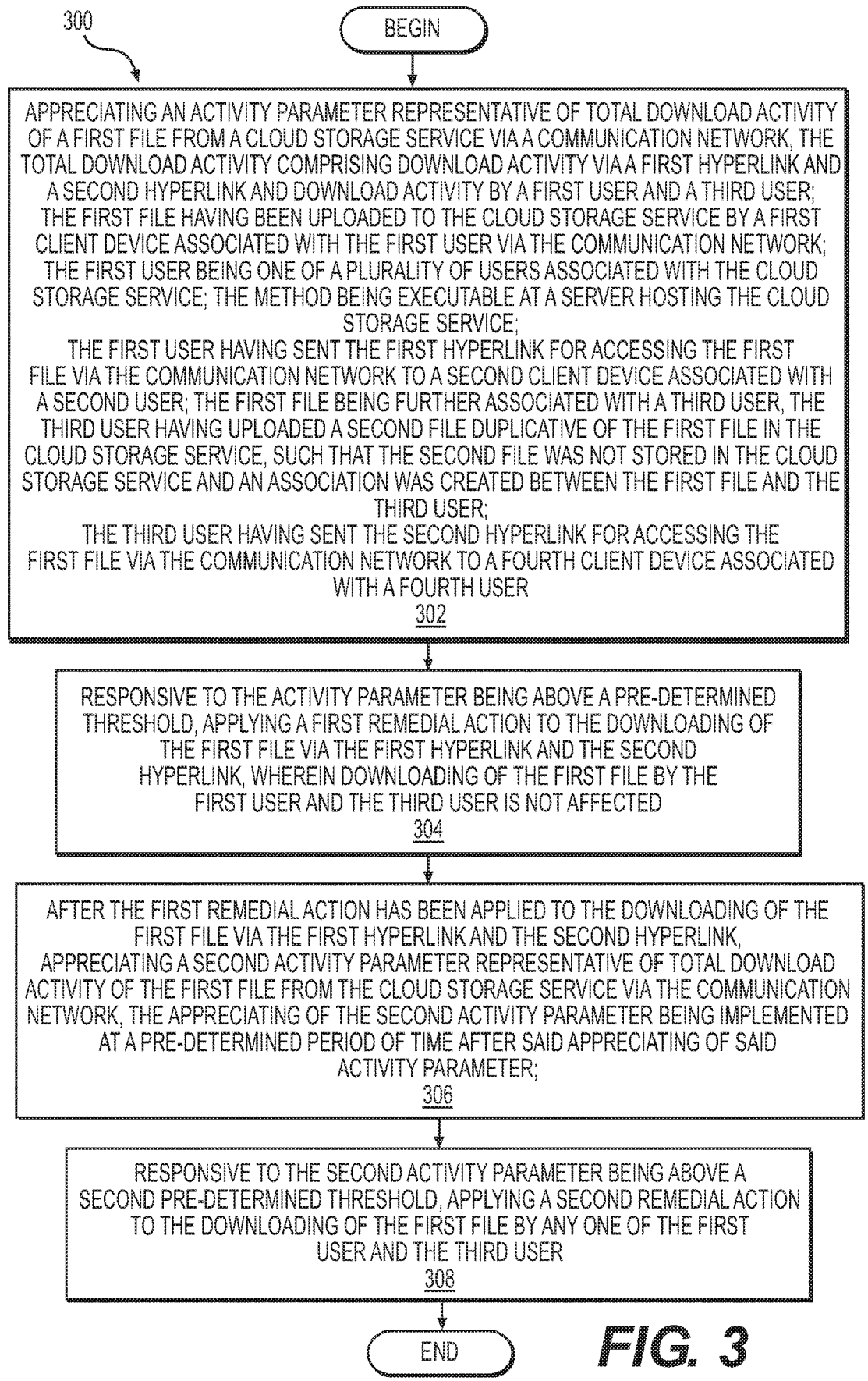
FIG. 3 is a block diagram depicting a method 300, the method 300 being implemented in accordance with another non-limiting embodiment of the present technology.

Reference is now made to FIG. 3, which is a block diagram depicting a method 300, which illustrates another non-limiting embodiment of the present technology.

Steps 302 and 304 are similar to steps 202 and 204 as described above.

Step 306—After the First Remedial Action has been Applied to the Downloading of the First File Via the First Hyperlink and the Second Hyperlink, Appreciating a Second Activity Parameter Representative of Total Download Activity of the First File from the Cloud Storage Service Via the Communication Network, the Appreciating of the Second Activity Parameter being Implemented at a Pre-Determined Period of Time After Said Appreciating of Said Activity Parameter In step 306 of the method 300, the cloud server 108 appreciates a second activity parameter. A second activity parameter may be the same or different as the activity parameter appreciated in steps 302 and 304. It should be understood that in some embodiments of the present technology, an administrator or operator associated with the cloud server 108 may choose an activity parameter based on an empirical review of downloading activities and patterns. Alternatively, an administrator or operator of the cloud server 108 may choose and set a particular activity parameter, and then amend the activity parameter to be appreciated from time to time, based for example, on user feedback or user test groups, or on ongoing downloading activities and patterns. In some implementations, an activity parameter set for a particular file and/or user may be stored in the file-user map 114, for example as a flag.

Distinct activity parameters (e.g., first activity parameter, second activity parameter, etc.) can be selected independently. Similarly, a pre-determined period of time will vary, and any suitable pre-determined period of time is intended to be included. As for exact value of the pre-determined period of time, an administrator or operator associated with the cloud server 108 may choose a pre-determined period of time based on an empirical review of downloading activities and patterns, and alternatively may amend the pre-determined period of time from time to time.

Step 308—Responsive to the Second Activity Parameter being Above a Second Pre-Determined Threshold, Applying a Second Remedial Action to the Downloading of the First File by Any One of the First User and the Third User Step 308 is similar to other such steps, as described above. It should be understood that in embodiments of methods provided herein, separate (first, second, etc.) activity parameters, pre-determined thresholds, and remedial actions can be selected independently. In other words, a second activity parameter may be the same as or different from a first activity parameter; a second pre-determined threshold may be the same as or different from a first pre-determined threshold; and a second remedial action may be the same as or different from a first remedial action. In each case, a parameter, threshold or action may be chosen by an administrator or operator associated with the cloud server 108, or may be set by an administrator or operator associated with the cloud server 108 and amended from time to time.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of controlling downloading of a first file in a cloud storage service, the first file having been uploaded to the cloud storage service by a first uploading client device associated with a first user via a communication network, the first user being one of a plurality of users associated with the cloud storage service; the method being executable at a server hosting the cloud storage service, the method comprising:

acquiring an activity parameter representative of total download activity of the first file by the plurality of users from the cloud storage service via the communication network, the plurality of users downloading the first file via a hyperlink by their respective data transmittal path to the server, the activity parameter comprising an indication of a number of different users downloading the first file; and responsive to the number of different users downloading the first file being above a pre-determined threshold, applying a first remedial action to the downloading of the first file, the first remedial action comprising:
preventing the plurality of users from downloading the first file, and
allowing downloading of the first file by the first uploading client device.

2. The method of claim 1, wherein:
the first user sends a first hyperlink for accessing the first file via the communication network to a second client device associated with a second user;
wherein the total download activity comprises download activity via the first hyperlink and download activity by the first user; and
wherein the first remedial action is applied only to downloading of the first file via the first hyperlink, such that downloading of the first file by the first user is not restricted.

3. The method of claim 2, wherein a second file is uploaded by a third uploading client device associated with a third user via the communication network, the second file being compared after uploading to the first file using a deduplication process; wherein:
a) if the second file is not duplicative of the first file in the cloud storage service, then the second file is stored in the cloud storage service in association with the third user; or,
b) if the second file is duplicative of the first file in the cloud storage service, then the second file is not stored in the cloud storage service, and an association is created between the first file and the third user.

4. The method of claim 3, wherein the second file was duplicative of the first file, and the third user sends a second hyperlink for accessing the first file via the communication network to a fourth client device associated with a fourth user;
the total download activity comprises download activity via the first hyperlink and the second hyperlink and download activity by the first user and the third user; and
the first remedial action is applied only to downloading the first file via the first hyperlink and the second hyperlink, such that downloading of the first file by the first user and the third user is not restricted.

5. The method of claim 4, further comprising:
after the first remedial action has been applied, acquiring a second activity parameter representative of total download activity of the first file from the cloud storage service via the communication network, the acquiring of the second activity parameter being implemented at a pre-determined period of time after said acquiring of said activity parameter;
responsive to the second activity parameter being above the pre-determined threshold, applying a second remedial action to the downloading of the first file by any one of the first user and the third user.

6. The method of claim 4, further comprising:
after the first remedial action has been applied, acquiring a second activity parameter representative of total download activity of the first file from the cloud storage service via the communication network, the acquiring of the second activity parameter being implemented at a pre-determined period of time after said acquiring of said activity parameter;
responsive to the second activity parameter being above the pre-determined threshold, acquiring a third activity parameter and a fourth activity parameter representative of download activity of the first file from the cloud storage service via the communication network by the first user and the third user, respectively;
responsive to any one of the third activity parameter and the fourth activity parameter being above a second pre-determined threshold, applying a second remedial action to the downloading of the first file by any one of the first user and the third user, respectively.

7. The method of claim 1, wherein the activity parameter is a combination of a number of different users downloading the first file and at least one of: a number of times the first file is downloaded and a bandwidth occupied by the total download activity of the first file.

8. The method of claim 5, wherein the second activity parameter is at least one of the following: the number of times the first file is downloaded, the number of different users downloading the first file, and the bandwidth occupied by the total download activity of the first file from the cloud storage service via the communication network.

9. The method of claim 6, wherein the third and fourth activity parameters are independently at least one of the following: the number of times the first file is downloaded, the number of different users downloading the first file, and the bandwidth occupied by the total download activity of the first file from the cloud storage service via the communication network.

10. The method of claim 5, wherein the pre-determined threshold is at least one of the following: the first file being downloaded at least 100 times; the first file being downloaded at least 300 times; the first file being downloaded by at least 100 different users; the first file being downloaded by at least 300 different users; and at least 100 GB of bandwidth occupied by the total download activity of the first file from the cloud storage service via the communication network.

11. The method of claim 5, wherein the second pre-determined threshold is at least one of the following: the first file being downloaded at least 100 times; the first file being downloaded at least 300 times; the first file being downloaded by at least 100 different users; the first file being downloaded by at least 300 different users; and at least 100 GB of bandwidth occupied by the total download activity of the first file from the cloud storage service via the communication network.

12. The method of claim 1, wherein the first remedial action comprises any one of reducing speed of the downloading activity, not allowing the downloading activity, and restricting downloading activity to between the hours of 10 pm and 6 am in the user's local time zone.

13. The method of claim 5, wherein the second remedial action comprises any one of reducing speed of the downloading activity, not allowing the downloading activity, and restricting downloading activity to between the hours of 10 pm and 6 am in the user's local time zone.

14. The method of claim 2, wherein said applying the first remedial action comprises:
(1) generating a trigger;
(2) sending the trigger via the communication network to the second client device; and
(3) the trigger causing the second client device to apply the first remedial action to the downloading of the first file by the second user via the first hyperlink.

15. The method of claim 4, wherein the first hyperlink and the second hyperlink are the same.

16. A method of controlling downloading of a first file in a cloud storage service, the first file having been uploaded to the cloud storage service by a first uploading client device associated with a first user via a communication network, the first user being one of a plurality of users associated with the cloud storage service; the method being executable at a server hosting the cloud storage service;
wherein the first user has sent a first hyperlink for accessing the first file via the communication network to a second client device associated with a second user;
wherein the first file is further associated with a third user, the third user having uploaded a second file duplicative of the first file in the cloud storage service, such that the second file was not stored in the cloud storage service and an association was created between the first file and the third user;
wherein the third user has sent a second hyperlink for accessing the first file via the communication network to a fourth client device associated with a fourth user;
the method comprising:
acquiring an activity parameter representative of total download activity of the first file from the cloud storage service via the communication network, the total download activity comprising download activity via the first hyperlink and the second hyperlink and download activity by a plurality of users including the first user, the second user, the third user and the fourth user having downloaded the file by their respective data transmittal path to the server; and
responsive to a number of different users downloading the first file being above a pre-determined threshold, applying a first remedial action to the downloading of the first file, the first remedial action comprising:
preventing a second subset of the plurality of users comprising at least the second user and the fourth user from downloading the first file, and allowing downloading of the first file by the first user and the third user.

17. The method of claim 16, further comprising:
after the first remedial action has been applied to the downloading of the first file via the first hyperlink and the second hyperlink, acquiring a second activity parameter representative of total download activity of the first file from the cloud storage service via the communication network, the acquiring of the second activity parameter being implemented at a pre-determined period of time after said acquiring of said activity parameter;
responsive to the second activity parameter being above a second pre-determined threshold, applying a second remedial action to the downloading of the first file by any one of the first user and the third user.

18. The method of claim 16, further comprising:
after the first remedial action has been applied to the downloading of the first file via the first hyperlink and the second hyperlink, acquiring a second activity parameter representative of total download activity of the first file from the cloud storage service via the communication network, the acquiring of the second activity parameter being implemented at a pre-determined period of time after said acquiring of said activity parameter;
responsive to the second activity parameter being above a second pre-determined threshold, acquiring a third activity parameter and a fourth activity parameter representative of download activity of the first file from the cloud storage service via the communication network by the first user and the third user, respectively;
responsive to any one of the third activity parameter and the fourth activity parameter being above any one of said pre-determined threshold and the second pre-determined threshold, applying a second remedial action to the downloading of the first file by any one of the first user and the third user, respectively.

19. The method of claim 16, wherein said applying the first remedial action comprises:
(1) generating a trigger;
(2) sending the trigger via the communication network to the second client device and the fourth client device; and
(3) the trigger causing the second client device and the fourth client device to apply the first remedial action to the downloading of the first file by the second user and the fourth user, respectively, via the first hyperlink and the second hyperlink, respectively.

20. A server configured to control downloading of a first file in a cloud storage service, the server hosting the cloud storage service, the first file having been uploaded to the cloud storage service by a first uploading client device associated with a first-user via a communication network, the first user being one of a plurality of users associated with the cloud storage service; wherein the server comprises a processor that is configured to:
acquire an activity parameter representative of total download activity of the first file by-the plurality of users from the cloud storage service via the communication network, the plurality of users downloading the first file via a hyperlink by their respective data transmittal path to the server, the activity parameter comprising an indication of a number of different users downloading the first file; and
responsive to the number of different users downloading the first file being above a pre-determined threshold, applying a first remedial action to the downloading of the first file, the first remedial action comprising:
preventing downloading of the first file by the plurality of users, and allowing downloading of the first file by the first uploading client device.

\* \* \* \* \*